United States Patent [19]

Bourland

[11] Patent Number: 4,665,118

[45] Date of Patent: * May 12, 1987

[54] PROCESSING ADDITIVE FOR VINYL COMPOUNDS

[75] Inventor: Larry G. Bourland, Downingtown, Pa.

[73] Assignee: Atlantic Richfield Company, Los Angeles, Calif.

[*] Notice: The portion of the term of this patent subsequent to Feb. 26, 2002 has been disclaimed.

[21] Appl. No.: 736,912

[22] Filed: May 22, 1985

[51] Int. Cl.$^4$ .................... C08L 23/12; C08L 23/16; C08K 5/09

[52] U.S. Cl. .................................... 524/394; 524/527

[58] Field of Search ............................ 524/527, 394

[56] References Cited

U.S. PATENT DOCUMENTS

| 4,218,353 | 8/1980 | Kim | 524/527 |
|---|---|---|---|
| 4,501,848 | 2/1985 | Bourland | 524/527 |
| 4,501,849 | 2/1985 | Bourland | 524/527 |
| 4,501,850 | 2/1985 | Bourland | 524/527 |

*Primary Examiner*—Herbert J. Lilling
*Attorney, Agent, or Firm*—Dennis M. Kozak

[57] ABSTRACT

A vinyl molding compound having a high melt flow rate propylene-based polymer and calcium stearate incorporated thereinto exhibits reduced processing energy upon molding.

7 Claims, No Drawings

PROCESSING ADDITIVE FOR VINYL COMPOUNDS

This invention relates to improved vinyl molding compounds.

More specifically, this invention relates to vinyl molding compounds having reduced processing energies.

In one of its more specific aspects, this invention relates to the modification of a vinyl molding compound by the introduction thereinto of a high melt flow rate propylene-based polymer and calcium stearate.

U.S. Pat. Nos. 4,501,848, 4,501,849 and 4,501,850 teach the incorporation of a high melt flow rate propylene-based polymer additive into a vinylidene chloride copolymer compound, a chlorinated polyvinyl chloride compound and a polyvinyl chloride compound, respectively. The teachings of these three patents are incorporated herein by reference thereto.

According to this invention there is provided an improved molding compound of the type containing a vinyl resin selected from the group consisting of polyvinyl chloride, chlorinated polyvinyl chloride and vinylidene chloride copolymer and from about 0.1 to about 10 parts per 100 parts of vinyl resin of a high melt flow rate propylene-based polymer containing 0 to 15 mole % recurring units of an olefinic comonomer having the general formula:

$$CH_2=CRR'$$

wherein R is a member selected from the group consisting of hydrogen and aromatic and aliphatic hydrocarbon groups containing 2 to 20 carbon atoms and R' is a member selected from the group consisting of hydrogen and methyl, wherein the improvement comprises from about 0.0016 to about 3.3 parts of calcium stearate per 100 parts of vinyl resin and wherein the ratio of said high melt flow rate propylene-based polymer to calcium stearate is within the range of from about 60:1 to about 3:1.

According to this invention there is also provided a method of producing a molded compound which comprises (1) forming a molding compound comprising a vinyl resin selected from the group consisting of polyvinylchloride, chlorinated polyvinylchloride and vinylidene chloride copolymer; from about 0.1 to about 10 parts per 100 parts of said vinyl resin of a high melt flow rate propylene-based polymer containing 0 to 15 mole % recurring units of an olefinic comonomer having the general formula:

$$C_2=CRR'$$

wherein R is a member selected from the group consisting of hydrogen and aromatic and aliphatic hydrocarbon groups containing 2 to 20 carbon atoms and R' is a member selected from the group consisting of hydrogen and methyl, from about 0.0016 to about 3.3 parts of calcium stearate per 100 parts of said vinyl resin, wherein the ratio of said high melt flow rate propylene-based polymer to calcium stearate is within the range of from about 60:1 to about 3:1, and (2) molding the resulting molding compound.

In a preferred embodiment, the high melt flow rate propylene-based polymer additive is a high melt flow rate polypropylene.

In another preferred embodiment, the high melt flow rate propylene-based polymer additive is a high melt flow rate propylene-ethylene copolymer.

In another preferred embodiment of this invention, the high melt flow rate propylene-based polymer will be employed in an amount within the range of from about 0.5 to about 5 parts per 100 parts of vinyl resin and calcium stearate will be employed in an amount within the range of from about 0.008 to about 1.65 parts per 100 parts of vinyl resin. The ratio of high melt flow rate propylene based polymer to calcium stearate will be within the range of from about 60:1 to about 3:1.

As used herein, the term "high melt flow rate" means a melt flow rate equal to or greater than 300 grams/10 minutes measured using A.S.T.M. D-1238-78, Condition L.

The high melt flow rate propylene-based polymer (HMFR) additive which is employed in this invention exhibits Newtonian flow characteristics and is an isotatic, crystalline propylene homopolymer or copolymer as previously defined. It will have a peak molecular weight of from about 15,000 to about 60,000. Suitable propylene-based polymers are prepared by the degradation of higher molecular weight propylene-based polymers and are commercially available. U.S. Pat. No. 3,144,436 teaches a method for degrading steroregular polymers and is incorporated herein by reference thereto. The high melt flow rate propylene-based polymer will have a melt flow equal to or greater than 300 g/10 mins., preferably equal to or greater than 900 g/10 mins.

Particularly suitable for use in this invention are the high melt flow rate propylene-based polymers (HMFR) designated Arvis ™ resins, available from ARCO Chemical Company, division of Atlantic Richfield Company.

Arvis ™ 1000 resin is a visbroken propylene homopolymer having a peak molecular weight of 47,000, a melt flow rate of 1600 g/10 min. and a melting point as determined by differential scanning colorimetry (DSC) of about 165° C.

Arvis ™ 3000 resin is a visbroken 2.5 wt.% ethylene/propylene copolymer having a peak molecular weight of 42,000, a melt flow rate of 1800 g/10 min. and a melting point by DSC of about 148° C.

Arvis ™ 5000 resin is a visbroken 4.5 wt.% ethylene/propylene copolymer having a peak molecular weight of 48,000, and a melting point by DSC of about 132° C.

The vinylidene chloride (VDC) copolymer base resins which can be used in the practice of this invention are well known in the art and selected based on specific application. The VDC copolymer resin can be a copolymer or a terpolymer of recurring units of vinylidene chloride and at least one polymerizable comonomer selected from the group consisting of vinyl chloride, acrylic and methacrylic acid esters, acrylonitrile, butadiene and the like. Examples of suitable VDC copolymers are vinylidene chloride/vinyl chloride; vinylidene chloride/methyl acrylate, vinylidene chloride/acrylonitrile, vinylidene chloride/methyl methylacrylate, vinylidene chloride/butyl acrylate and the like. The VDC copolymer resin can be produced by either suspension or emulsion polymerization and will contain from about 55 to about 99 mole %, preferably from about 75 to about 95 mole % percent of recurring units of vinylidene chloride.

Reference is made to The Dow Chemical Company product bulletin entitled Saran Resins in Extrusion, Molding and Powder Applications ©1979, Form No. 190-289-79; U.S. Pat. No. 3,642,743 related to suspension polymerization of VDC copolymers; U.S. Pat. No. 3,291,769 related to emulsion polymerization of VDC copolymer; and Ham, G. E. ed. "Copolymerization" Chap. X Interscience, New York, 1964, 587-637, the teachings of all of which are incorporated herein by reference thereto.

Vinylidene chloride/vinyl chloride copolymers suitable for use in this invention are commercially available from The Dow Chemical Company and are designated Saran ® resins.

To inhibit degradation various stabilizers can be added to the VDC copolymer based molding compositions. Suitable heat stabilizers include tetrasodium pyrophosphate and epoxidized oils, e.g. soybean or linseed oils. U.S. Pat. No. 3,882,081 teaches a process for stabilizing VDC copolymers against metal induced degradation using a combination of a dibasic lead phosphate and 1,4 benzoquinone.

The chlorinated polyvinyl chloride base resins suitable for use in this invention can be chlorinated homopolymers or vinyl chloride or chlorinated copolymers of vinyl chloride with up to about 20 weight percent of a copolymerizable olefinically unsaturated comonomer. CPVC resins are typically prepared by the post chlorination of polyvinyl chloride resin via bubbling chlorine gas into the solvent swollen polyvinyl chloride resin and are available with weight percent chlorine contents within the range of from about 63 to about 68.5. CPVC resins are commercially available from B. F. Goodrich and Kaneka America. Reference is made to Chapter 17 "The Compounding of Polyvinyl Chloride" by N. L. Perry, Encyclopedia of PVC volume 2, ©1977 the teachings of which are incorporated herein by reference thereto due to their applicability to CPVC compounding as well as PVC compounding.

To inhibit the degradation that the CPVC base resin would undergo at processing temperature, a stabilizer is added. Suitable stabilizers are well known and include tin mercaptides, tin carboxylates, barium-cadmiums, calcium-zincs and leads.

The polyvinyl chloride base resins which can be used in this invention are well known in the art and are selected based on the specific application. The PVC resin chosen can be a homopolymer of vinyl chloride or a copolymer of vinyl chloride with up to about 20 weight percent of a copolymerizable olefinically unsaturated comonomer, and it can be manufactured by suspension, emulsion or bulk polymerization. Reference is made to Chapter 17 "The Compounding of Polyvinyl Chloride" by N. L. Perry, Encyclopedia of PVC volume 2, ©1977 the teachings of which are incorporated herein by reference thereto.

To inhibit the degradation that the PVC base resin would undergo at processing temperatures, a stabilizer is added. Suitable stabilizers are well known and include tin mercaptides, tin carboxylates, barium-cadmiums, calcium-zincs and leads.

Optionally, for certain specific applications, the vinyl compounds can be formulated to also include various pigments, fillers, antistatic agents, reoderants, dulling or flattening agents and the like.

The terms "molding, "moldable" and "molded" as used herein are understood to include all sheet and profile extrusion processes.

Reference is made to the following examples which serve the demonstrate the invention.

EXAMPLES

A series of nine molding compositions (I-IX) were prepared by intensive dry mixing the amounts of the ingredients below. All nine compositions were identical except that each employed a different lubricant—a total of 2 parts of lubricant per each 100 parts of vinyl resin being incorporated into each composition.

| Ingredient | Amount (parts) |
| --- | --- |
| polyvinylchloride resin[1] | 100 |
| stabilizer[2] | 1.4 |
| impact modifier[3] | 6.0 |
| titanium dioxide[4] | 12.0 |
| lubricant | 2.0 |

[1]Borden VC100 (0.92 intrinsic viscosity) resin
[2]Mark ® 2212 organo tin stabilizer, Witco Chemical
[3]Acryloid ® KM3231B impact modifier, Rohm & Haas
[4]DuPont Grade R101

Each molding composition was separately extruded on a Haake TW 100 counter rotating, conical twin screw extruder, using standard screws. The temperature profile of the extruder in °C. was 200 (hopper), 190, 180, 180 (die). The extruder was run at 61 rpm and the die orifice diameter was 1/16 inch.

The following table identifies the composition of the 2 parts of lubricant employed in each of the nine molding compositions and sets forth the processing energy in Watt-hrs/pound (at 85% of flood feed to the extruder hopper) required to extrude each composition.

| Example No. | Lubricant (phr) | | Ratio HMFR:CS | Processing Energy[1] Watt-hrs/lb |
| --- | --- | --- | --- | --- |
| | HMFR Polymer | Calcium Stearate | | |
| I (Control) | 2.0 | 0 | — | 34.8 |
| II | 1.97 | .03 | 60:1 | 34.4 |
| III | 1.95 | .05 | 40:1 | 33.7 |
| IV | 1.90 | .10 | 20:1 | 28.9 |
| V | 1.82 | .18 | 10:1 | 27.4 |
| VI | 1.67 | .33 | 5:1 | 27.4 |
| VII | 1.60 | .40 | 4:1 | 27.6 |
| VIII | 1.50 | .50 | 3:1 | 30.2 |
| IX (Control) | 0 | 2.0 | — | 30.7 |

[1]Processing Energy (E) is the mechanical energy normalized for output rate applied to extruder screws to accomplish melt processing measured in units of energy per pound of extrudate.

$$E = \frac{\text{(torque applied to screws) (screw rpm)}}{\text{output rate}},$$

if extruder has a load cell to monitor torque or, $$E = \frac{\text{(motor current draw) (motor supply voltage)}}{\text{output rate}},$$

if extruder has an ammeter to monitor motor current.

The data of the table show that the use of a combination of a high melt flow rate propylene polymer and calcium stearate in a ratio within the range of from about 60:1 to about 3:1 serves to significantly reduce the processing energy needed to mold vinyl molding compounds.

It will be evident from the foregoing that various modifications can be made to this invention. Such, however, are considered as being within the scope of the invention.

What is claimed is:

1. An improved molding compound of the type containing a vinyl resin selected from the group consisting of polyvinyl chloride resin, chlorinated polyvinyl chloride resin and vinylidene chloride copolymer resin and from about 0.1 to about 10 parts per 100 parts of vinyl resin of a high melt flow rate propylene-based polymer containing 0 to 15 mole % recurring units of an olefinic comonomer having the general formula:

$$CH_2=CRR'$$

wherein R is a member selected from the group consisting of hydrogen and aromatic and aliphatic hydrocarbon groups containing 2 to 20 carbon atoms and R' is a member selected from the group consisting of hydrogen and methyl, wherein the improvement comprises from about 0.0016 to about 3.3 parts of calcium stearate per 100 parts of vinyl resin and wherein the ratio of said high melt flow rate propylene-based polymer to calcium stearate is within the range of from about 60:1 to about 3:1, said high melt flow rate propylene-based polymer having a melt flow rate of at least 300 g/10 minutes measured using ASTM D-1238-79 Condition L and a peak molecular weight of from about 15,000 to about 60,000.

2. The composition of claim 1 containing from about 0.5 to about 5 parts per 100 parts of vinyl resin of said high melt flow rate propylene-based polymer and from about 0.008 to about 1.65 parts per 100 parts of vinyl resin of calcium stearate.

3. The composition of claim 1 in which said high melt flow rate propylene-based polymer has a melt flow rate of at least 900 g/10 minutes measured using A.S.T.M. D-1238-79 Condition L.

4. The molding compound of claim 1 in which said high melt flow rate propylene-based polymer is a propylene homopolymer.

5. The molding compound of claim 1 in which said high melt flow rate propylene-based polymer is a propylene-ethylene copolymer.

6. The molding compound of claim 1 in which said vinylidene chloride copolymer resin is vinylidene chloride/vinyl chloride copolymer.

7. A method of producing a molded compound which comprises (A) forming a molding compound comprising a vinyl resin selected from the group consisting of polyvinylchloride resin, chlorinated polyvinylchloride resin and vinylidene chloride copolymer resin; from about 0.1 to about 10 parts per 100 parts of said vinyl resin of a high melt flow rate propylene-based polymer containing 0 to 15 mole % recurring units of an olefinic comonomer having the general formula:

$$CH_2=CRR'$$

wherein R is a member selected from the group consisting of hydrogen and aromatic and aliphatic hydrocarbon groups containing 2 to 20 carbon atoms and R' is a member selected from the group consisting of hydrogen and methyl, from about 0.0016 to about 3.3 parts of calcium stearate per 100 parts of said vinyl resin, wherein the ratio of said high melt flow rate propylene-based polymer to calcium stearate is within the range of from about 60:1 to bout 3:1, and (B) molding the resulting molding compound.

* * * * *